United States Patent [19]

Tortella et al.

[11] Patent Number: 5,666,892
[45] Date of Patent: Sep. 16, 1997

[54] COMBINED FARM MACHINE PERFORMING ALL OF THE SEEDING OPERATIONS IN ONE PASS

[75] Inventors: Michele Tortella; Carlo Tortella, both of Ortona, Italy

[73] Assignee: Industria Meccanica F. lli Tortella S.p.A., Ortona, Italy

[21] Appl. No.: 603,915

[22] Filed: Feb. 22, 1996

[30] Foreign Application Priority Data

Feb. 23, 1995 [IT] Italy ................. RM95A0111

[51] Int. Cl.⁶ ................................................. A01B 49/06
[52] U.S. Cl. ........................ 111/52; 111/148; 111/177; 111/157; 111/194
[58] Field of Search .................... 111/52, 59, 142, 111/147, 148, 152, 153, 156, 157, 177, 189, 191, 194

[56] References Cited

U.S. PATENT DOCUMENTS

| | | | |
|---|---|---|---|
| 158,408 | 1/1875 | Dixson | 111/148 X |
| 1,571,481 | 2/1926 | Kasmeier | 111/157 X |
| 3,170,421 | 2/1965 | Norris et al. | 111/148 |
| 3,640,234 | 2/1972 | Carroll et al. | |
| 3,714,913 | 2/1973 | Gandrud | 111/189 X |
| 4,055,126 | 10/1977 | Brown et al. | 111/148 |
| 4,088,083 | 5/1978 | Dail, Jr. et al. | 111/148 X |
| 4,213,408 | 7/1980 | West et al. | 111/148 X |
| 4,230,054 | 10/1980 | Hatcher | 111/148 X |
| 4,241,674 | 12/1980 | Mellinger | 111/148 |
| 4,267,783 | 5/1981 | Hendrix et al. | 111/148 |
| 4,268,398 | 5/1981 | Shuck et al. | |
| 4,324,295 | 4/1982 | Weichel | 111/148 X |
| 4,411,206 | 10/1983 | Hiscock | 111/189 X |
| 4,492,172 | 1/1985 | Gramckow | 111/157 X |
| 4,529,040 | 7/1985 | Grollimund | |
| 4,601,248 | 7/1986 | Beasley | 111/148 X |
| 4,754,815 | 7/1988 | Brouwer et al. | |

FOREIGN PATENT DOCUMENTS

| | | | |
|---|---|---|---|
| 799190 | 11/1968 | Canada | 111/189 |
| 1166900 | 5/1985 | Canada | 111/189 |
| 549221 | 2/1925 | France | 111/189 |
| 3722842 | 1/1989 | Germany | 111/148 |

*Primary Examiner*—Terry Lee Melius
*Assistant Examiner*—Christopher J. Novosad
*Attorney, Agent, or Firm*—DeLio & Peterson, LLC

[57] ABSTRACT

Combined farm machine performing all of the seeding operations in one pass, comprising: a frame with a three-point attachment for the connection to the tractor and a hydraulic pump; several soil rippers; a roller for the macro- and microtillage of soil; a mechanical hopper seeder with rotating devices, from which several tubular seeding members project; several spring harrows and a levelling blade or door, which machine also includes a ploughing roller for the differentiated tillage of the soil, having several annular ribbings projecting in the same number as the seeding members and aligned therewith, the ploughing roller being rotated by motor.

6 Claims, 4 Drawing Sheets

COMBINED FARM MACHINE PERFORMING ALL OF THE SEEDING OPERATIONS IN ONE PASS

The present invention relates to a combined farm machine performing all of the seeding operations in one pass.

As known, the seeding is a very delicate, laborious operation and must be performed following severe criteria involving very accurate steps of preparing the soil. To this end, some machines have been devised and manufactured which, however, do not solve all of the problems pertinent to the seeding operation. There are at present some seeding machines on the market consisting of a roller for macro- and microtillage of the soil and a seeder formed of a plurality of tubular seeding members. In one machine of the state of art, carried by a tractor, some seeding members sow the seeds of the desired cultivation, coming out of a hopper tank supported by the frame of the machine, into the soil tilled by several soil rippers and levelled by a blade or a grader located behind the soil rippers. Before sowing the seeds, a rotopin located before the seeding members tills the soil and breaks up a strip of soil having the same width as the machine and receiving then the seeds.

Even if the machine disclosed above works rather satisfactorily, the soil is not perfectly tilled and has some problems such as a not thorough preparation of the seed bed and a not perfect covering of the seeds, especially on dry soils and the like, and comes up against a number of difficulties also on damp soils where it does not even work.

The present invention seeks to provide an improved machine which besides overcoming the problems mentioned above permits further undoubted advantages to be achieved such as compacting the soils in a differentiated way so that the earth is more rammed down along the strip containing the seeds and softer at both sides thereof. The machine of this invention combines the typical parts of a known machine and a ploughing roller, i.e. a roller of new design having one compacting ribbing for each seeding member as better explained thereafter.

Further advantageous features of the machine of the present invention are the motorization of such a ploughing roller and the synchronization of the movement of the same with the seeder, which allows the seeds to be evenly sown and the advantages of an uniform tillage to be achieved. In other words the combined farm machine according to the invention has the advantages of allowing wet soils to be seeded as the seeding members do not touch the earth because they are hanging at a height from the soil which may be set according to the tillage requirements. Any stoppage of the seeding members is then avoided, moreover the seeds are sown to the right seeding depth as the seeding members sow the seeds on line with the ribbings of the ploughing roller so that they are closer to the soil than the conventional machine.

As the seeds are pressed into the soil and not merely set down, as it is the case with other seeding methods, a faster, flourishing, homogeneous shooting is obtained. The advantages of such method are even more evident when fine seeds are sown or when dry soils are tilled or in case many problems have to be overcome.

In addition, the ploughing roller provides a differentiated compacting of the soil which is more rammed down along the strip containing the seeds and softer at both sides thereof; such a situation allows the capillary water bed to be better reached, thus achieving all of the implied advantages both with damp and dry soils. According to the invention, the furrows receiving the seeds are thereafter covered over by spring harrows located behind the ploughing roller.

The operation of the system, even on clayey and particularly sticky and damp soils, is ensured by that the roller is hydraulically driven so that its rotation does not ever stop during the work; moreover, a roller cleaning blade for avoiding the earth accumulation is provided. As better explained thereafter, the equipment for the microtillage of the soil combined with the ploughing roller and the synchronized seeder is very important as it provides a machine which prepares an excellent seed bed and works on the hard soils mentioned above. To this purpose, the preferred equipment is the rotopin.

Summing up, the machine according to the invention performs the following operations in one pass:

breaking up or microtillage of soil by the rotopin;

soil levelling by the rotopin door;

sowing at the ploughing roller metal ribbings;

differentiated soil compacting and seed planting out by the ploughing roller;

covering of the seeds by the spring harrow.

The invention will now be described in detail with reference to the accompanying drawings, in which.

Figure 1:
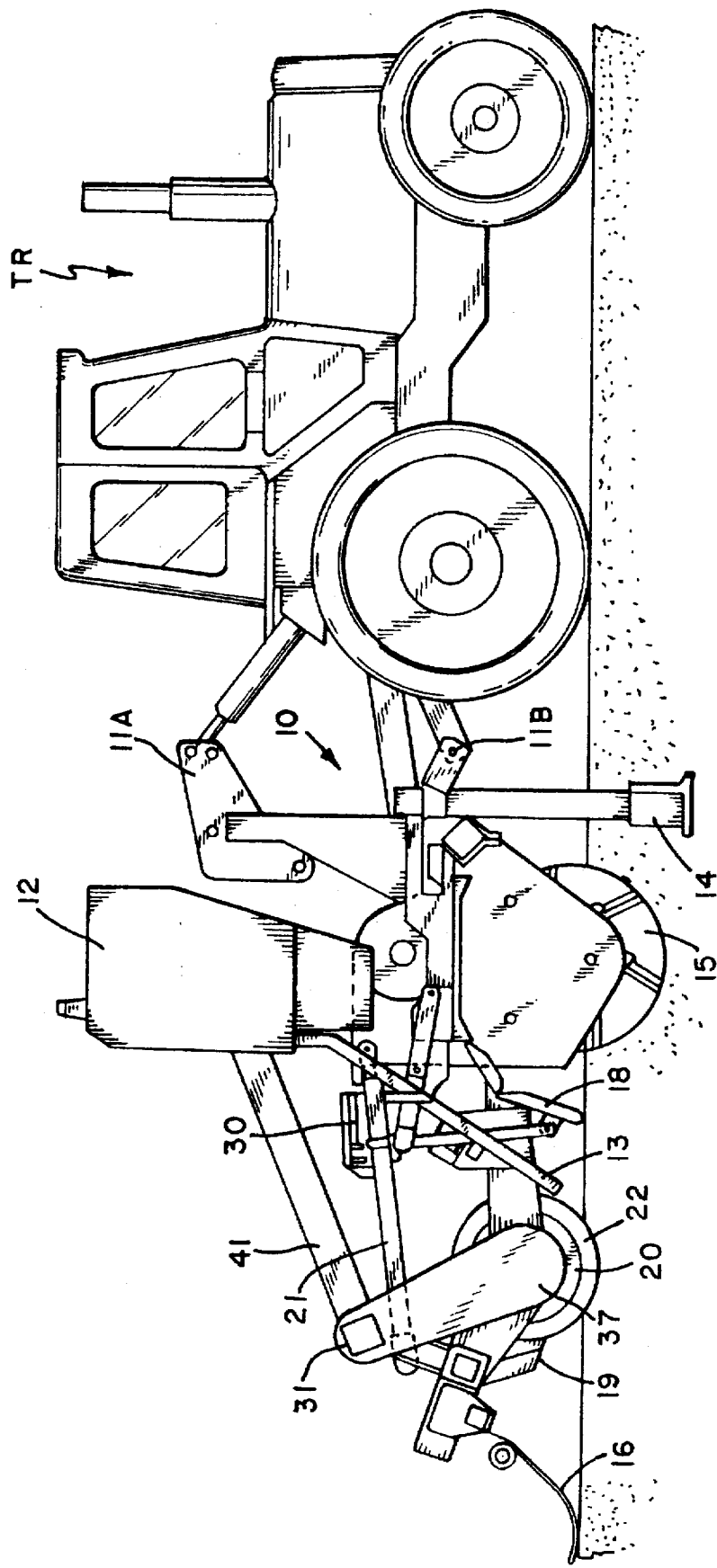
FIG. 1 is a schematic side view of the combined machine attached to the tractor.
Figure 2:
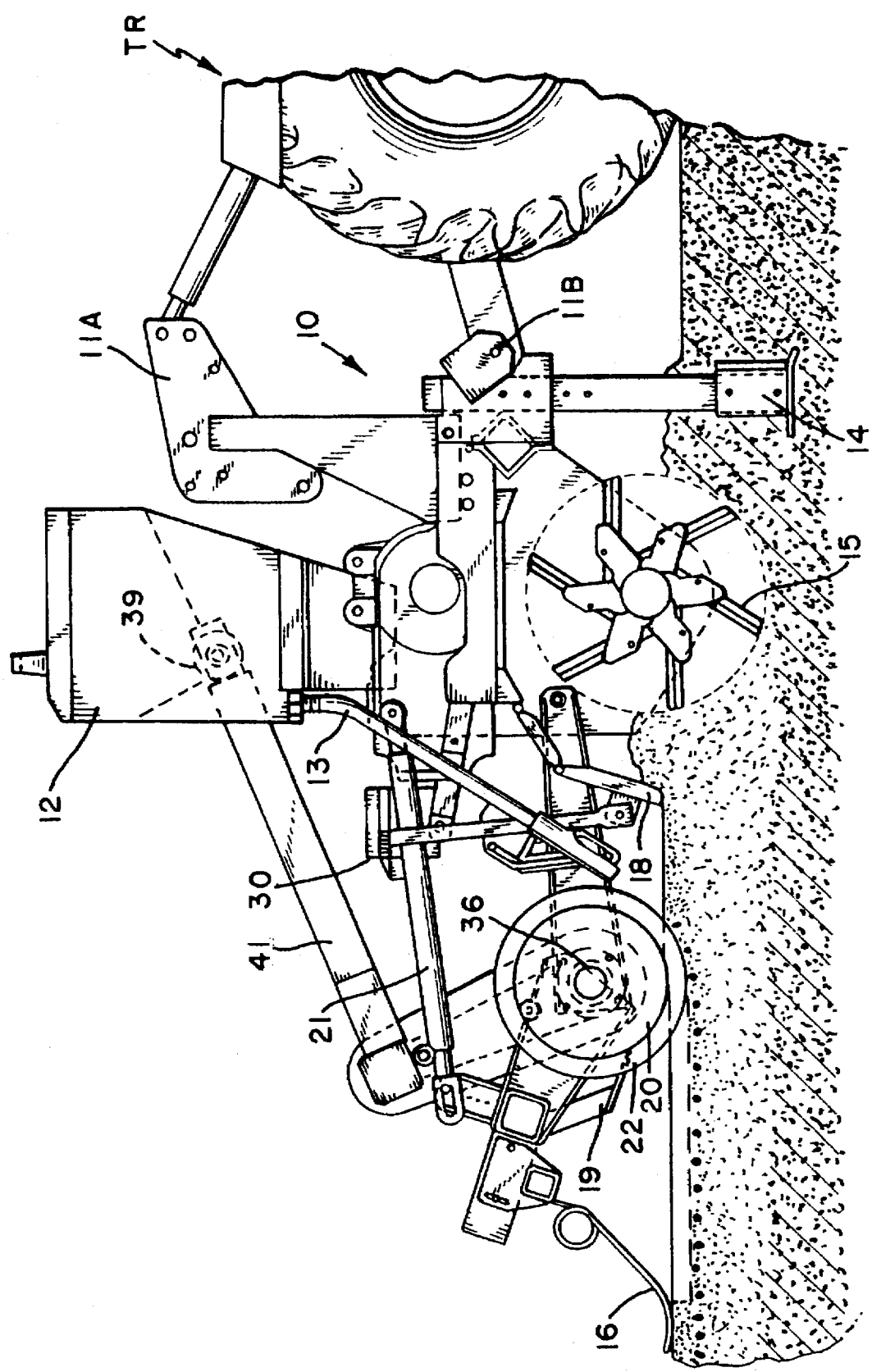
FIG. 2 is a similar view of the combined machine with sectioned parts showing the interior.

Referring to FIGS. 1 and 2, there is shown a combined machine according to the invention comprising a carrier frame 10, as usual in machines of such a type, a three-point attachment 11A, 1B for tractor TR, several tubular seeding members 13 projecting from a hopper seeder 12, four aligned soil rippers 14, a rotopin roller 15, several harrows 16, and a levelling blade or door 18.

According to the invention, the above-mentioned units are combined with the ploughing roller of this invention, indicated at 20 and supported by a swinging frame having setting arms 21, a cleaning blade or roller-cleaning blade 19 engaging said roller for cleaning purposes.

Figure 3:
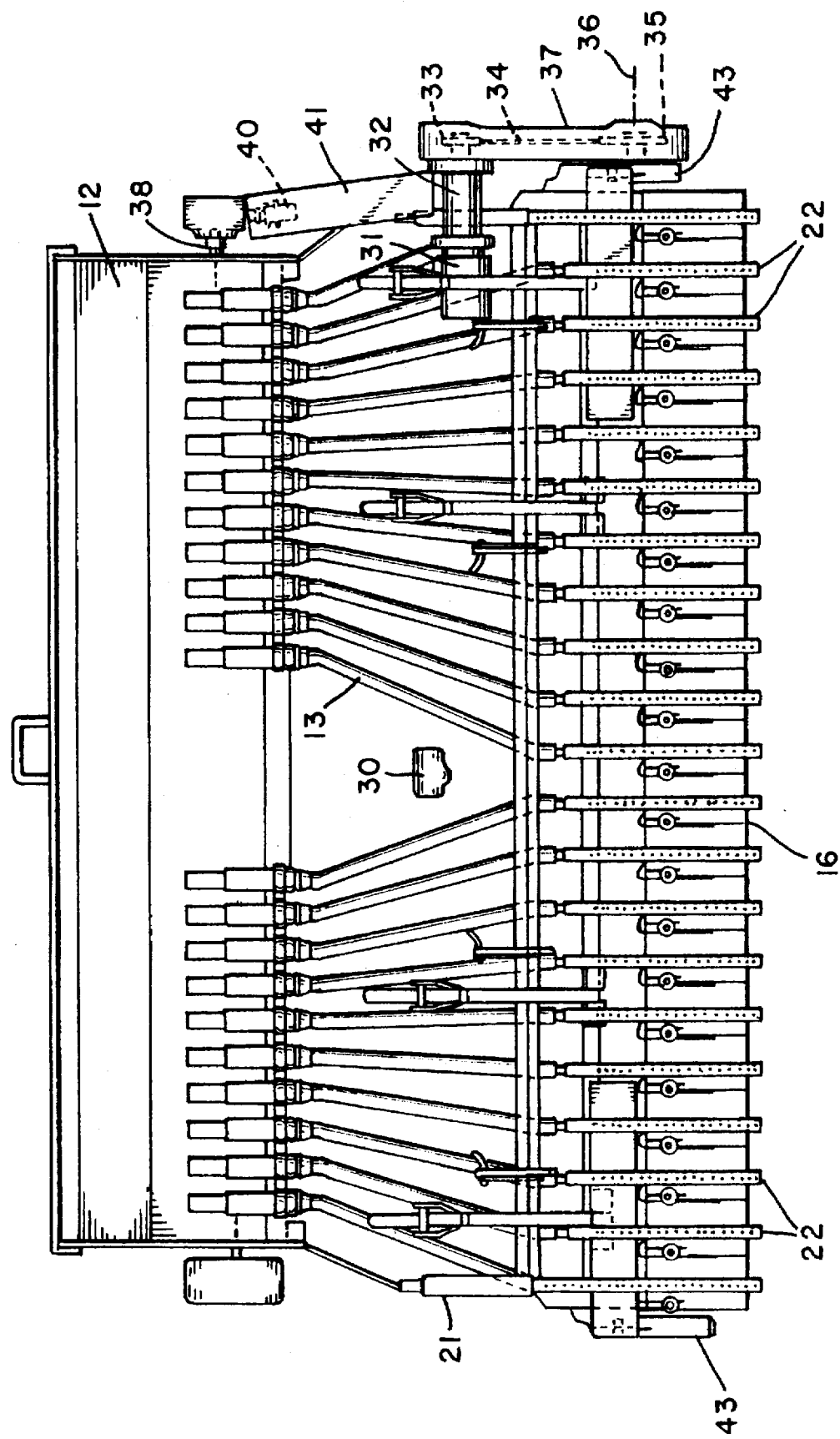
FIG. 3 is a rear view.
Figure 4:
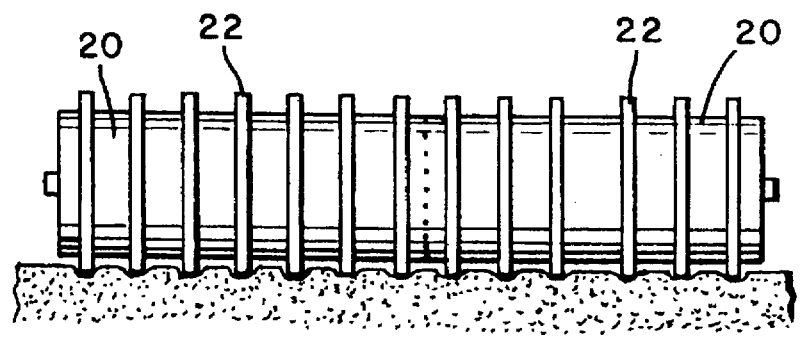
FIG. 4 is a schematic view of the ploughing roller and the soil tilled thereby.

As mentioned above, the ploughing roller 20 of the invention includes a cylindrical body carrying a number of annular ribbings parallel to and axially spaced apart from one another, indicated at 22, ribbings 22 being in the same number as the seeding members 13 and axially aligned therewith (FIG. 3).

Further the machine has a hydraulic pump 30 (FIGS. 1 and 2) driving a hydraulic motor 31 carried by frame 10 which rotates a shaft 32 carrying a sprocket wheel 33 engaging a chain 34 which transmits the movement to a second sprocket wheel 35 integral with the axis 36 of roller 20, the whole assembly being secured to a case 37.

Moreover, movement of shaft 32 is transmitted by a conical pair (not shown) to shaft 38 driving some rotating devices 39, known in itself, of seeder 12 by a Cardan joint 40 located in a case 41.

Figure 5:
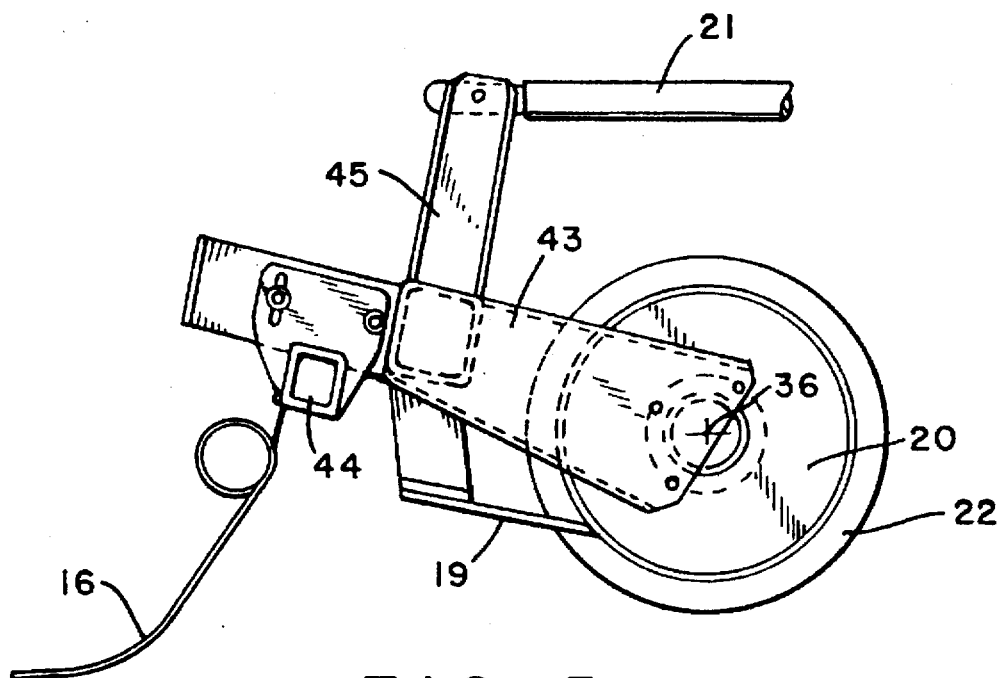
FIG. 5 is a detail showing the support of the ploughing roller.

Axis 36 of roller 20 is supported at the ends of two swinging box-like side arms 43, only one of which is apparent in FIG. 5, which also support a cross beam 44 to which the spring harrows 16 are secured in crosswise alignment. Connected to upper ends 45 of arms 43 are further arms 21, the adjustable length of which establishes the pressure of roller 20 on the soil.

In the operation of the machine made up of the components explained above, the length of the adjustable arms 21 is set so as to determine the angular position of the swinging arms 43 and to bring roller 20 to the desired depth and pressure, and then tractor TR is started.

Hydraulic pump 30 and hydraulic motor 31 are then operated, said motor rotating both roller 20 through shaft 32 and chain 34 and shaft 38 of the rotating devices 39 of seeder 12.

Now the whole combined machine of this invention is running and performs the following operations:

a) splitting and breaking up the soil by the combined operations of soil rippers 14 and rotopin 15;

b) soil levelling by rotopin door 18;

c) sowing the seeds from hopper 12 through each seeding member 13 along a track aligned with the corresponding annular ribbing 22 of ploughing roller 20;

d) differentiated soil compacting by roller 20, harder at the seeding line through the corresponding projecting ribbings 22, and softer at the cylindrical surface of the roller between them;

e) covering of the seeds sown by seeding members 13 through spring harrow 16 corresponding to that seeding line (see FIG. 3).

The attention should be turned again to the synchronized movement of ploughing roller 20 and rotating devices 39 of the seeder connected to one another, which achieves an absolutely homogeneous seeding operation.

Such a feature along with the differentiated operations of ploughing roller 20 on the soil achieves seeding results which cannot be obtained by the combined machines of the previous state of art.

Figure 6:
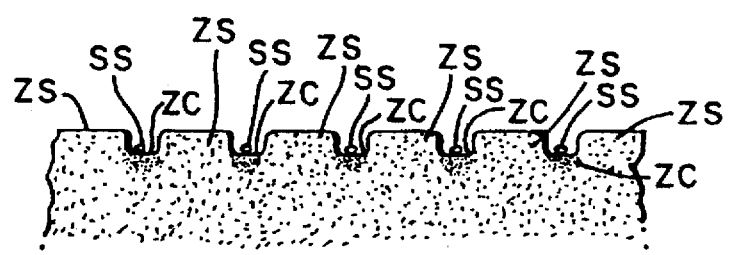
FIG. 6 shows a section view of the soils tilled by the machine.

Turning now to the construction of ploughing roller 20, the differentiated operations of the latter, shown in FIG. 6, causes the furrows containing the seeds SS, which are compacted to a greater extent by the corresponding ribbings 22, as indicated at ZC, to have laterally softer strips of soil indicated at ZS.

This allows a better communication between the seeding line ZC and the capillary water bed and achieves several advantages both on damp and dry soils.

We claim:

1. A combined farm machine comprising:

a main frame (10) having a three-point attachment (11A, 11B) adapted for connection to a tractor (TR);

a hydraulic pump (30) mounted on main frame (10);

a plurality of soil rippers (14) supported by said main frame (10);

a roller (15) for the macro and microtillage of soil, said roller (15) being supported by main frame (10);

a mechanical hopper seeder (12) supported by said main frame (10) and having a plurality of rotating delivering devices (39);

a shaft (38) for rotating said delivering devices (39);

a plurality of tubular seeding members (13) projecting downwardly from said mechanical hopper seeder (12);

a plurality of spring harrows (16) supported by said main frame (10);

a leveling blade (18) attached to said main frame (10), said roller (15) and said leveling blade (18) being supported upstream of said tubular seeding members (13);

a frame (43) pivotally attached to said main frame (10); and a ploughing roller (20) having a shaft (36) attached thereto, said roller (20) being supported by said frame (43) and located downstream of said tubular seeding members (13) to perform a differential tillage of the just seeded soil that is then worked by said harrows (16) which operate to cover the sown seeds.

2. The combined farm machine according to claim 1, wherein said ploughing roller (20) has a cylindrical surface and a plurality of annular ribbings (22) radially projecting from the cylindrical surface, said ribbings (22) being parallel to and regularly spaced apart from one another.

3. The combined farm machine according to claim 2 wherein each of said projecting ribbings (22) of said ploughing roller (20) is longitudinally aligned with a corresponding one of said seeding members (13).

4. The combined farm machine according to claim 2 wherein each of said harrows (16) tills the soil in alignment with a corresponding seeding member (13) so as to cover with soil the just sown seeds.

5. The combined farm machine according to claim 1 further comprising:

a hydraulic motor (31) supported by said frame (10) and driven by said hydraulic pump (30);

a drive device connected to said hydraulic motor (31), said drive device comprising:

a main shaft (32);

a first sprocket wheel (33) integral with said main shaft (32);

a second sprocket wheel (35) integral with said shaft (36) of said ploughing roller (20); and a chain (34) engaged on said first sprocket wheel (33) and second sprocket wheel (35), said chain (34) being mounted inside said swinging frame (43) in order to transmit the rotary movement of said hydraulic motor (31) to said ploughing roller (20).

6. The combined farm machine according to claim 5, wherein said main shaft (32) is connected to said shaft (38).

* * * * *

UNITED STATES PATENT AND TRADEMARK OFFICE
CERTIFICATE OF CORRECTION

PATENT NO. : 5,666,892
DATED : Sep. 16, 1997
INVENTOR(S) : Tortella et al.

It is certified that error appears in the above-identified patent and that said Letters Patent is hereby corrected as shown below:

In column 2, line 39, please delete "1B" and substitute therefor -- 11B --.

Signed and Sealed this

Twenty-fifth Day of November, 1997

Attest:

BRUCE LEHMAN

*Attesting Officer*  *Commissioner of Patents and Trademarks*